United States Patent [19]

Bravo

[11] Patent Number: 5,285,829
[45] Date of Patent: Feb. 15, 1994

[54] GASOLINE CONTAINMENT SYSTEMS WITH LEAK-RESISTANT PLASTIC FITTINGS

[76] Inventor: Sergio M. Bravo, 2872 Tigertail Dr., Los Alamitos, Calif. 90720

[21] Appl. No.: 836,787

[22] Filed: Feb. 14, 1992

[51] Int. Cl.$^5$ .............................. B65B 1/04; B65B 3/04
[52] U.S. Cl. ..................................... 141/88; 141/367; 141/368; 137/312
[58] Field of Search .................... 141/85, 86, 87, 88, 141/59, 311 A, 311 R, 367, 368, 383, 386; 137/312, 314, 236.1, 234.6, 364, 372; 285/192, 194, 220, 353-357, 390, 133.1, 201, 206, 161, 207, 196, 338, 341, 158; 138/101, 112, 113; 174/151, 152 G, 153 R; 277/110, 102, 105, 115, 117, 121, 178; 405/52, 53

[56] References Cited

U.S. PATENT DOCUMENTS

| | | | |
|---|---|---|---|
| 1,473,300 | 11/1923 | Kruger | 285/201 |
| 2,464,332 | 3/1949 | Maund et al. | 285/206 |
| 2,985,291 | 5/1961 | Schoepe et al. | 174/151 |
| 3,104,120 | 9/1963 | Myers | 285/206 |
| 3,435,128 | 3/1969 | Dörwald | 174/151 |
| 3,998,515 | 12/1976 | Panek | 339/117 P |
| 4,842,163 | 6/1989 | Bravo | 222/40 |
| 4,932,257 | 6/1990 | Webb | 73/40.5 R |
| 4,971,225 | 11/1990 | Bravo | 222/110 |
| 4,971,477 | 11/1990 | Webb et al. | 405/154 |
| 4,983,784 | 1/1991 | Whitlock | 174/65 SS |
| 5,051,541 | 9/1991 | Bawa et al. | 285/161 |
| 5,135,324 | 8/1992 | Bravo | 137/236.1 |

FOREIGN PATENT DOCUMENTS 720741 2/1932 France.
1562838 4/1969 France.

Primary Examiner—Henry J. Recla
Assistant Examiner—Steven O. Douglas
Attorney, Agent, or Firm—Christie, Parker & Hale

[57] ABSTRACT

A containment box for collecting leaking gasoline from gasoline handling equipment, such as a gasoline dispenser, is disposed below the dispenser. The box receives a gasoline supply pipe passing through an aperture, and a fitting is provided for sealing the aperture and adjustably fixing the supply pipe. The fitting includes a main body, a deformable element, a seating piece for seating the deformable element and threaded to the main body, and a clamping piece threadable onto the seating piece to cam the deformable element radially inward to contact the supply pipe. The box has another aperture through which a conduit passes, and there is a universal fitting for sealing that aperture. The universal fitting includes a main body with an external shoulder and a nut which threads onto the main body, with gaskets disposed between the shoulder and box and between the nut and box. The main body has an integrally formed internal shoulder for supporting sealing compound. The box has a further aperture for communicating with a vapor recovery pipe, and there is another universal fitting identical to the first for connecting with the pipe. There is also an underground terminator fitting for connecting two double-walled pipes so as to allow flow through the primary pipes, but prevent flow through the outer pipes.

28 Claims, 11 Drawing Sheets

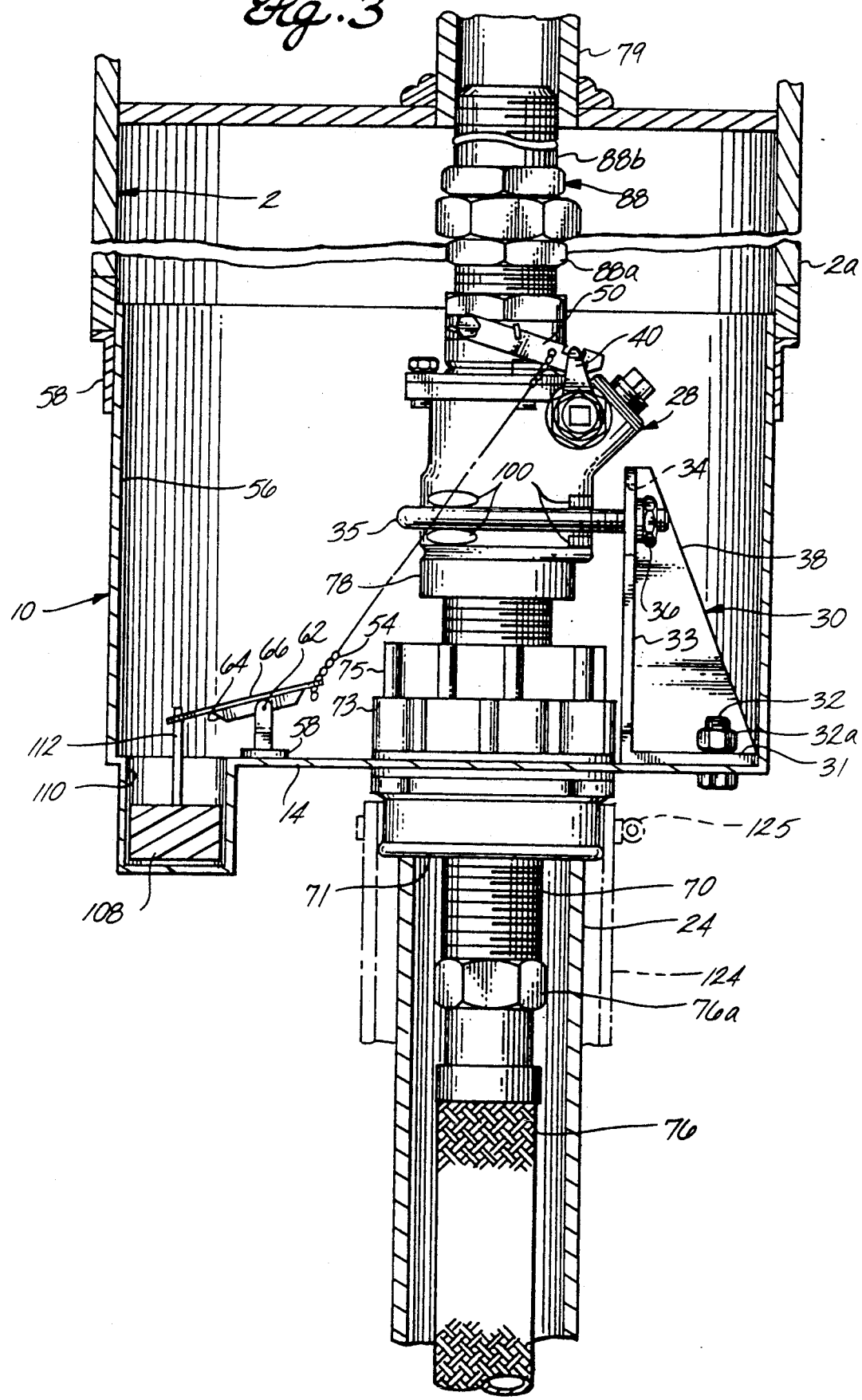

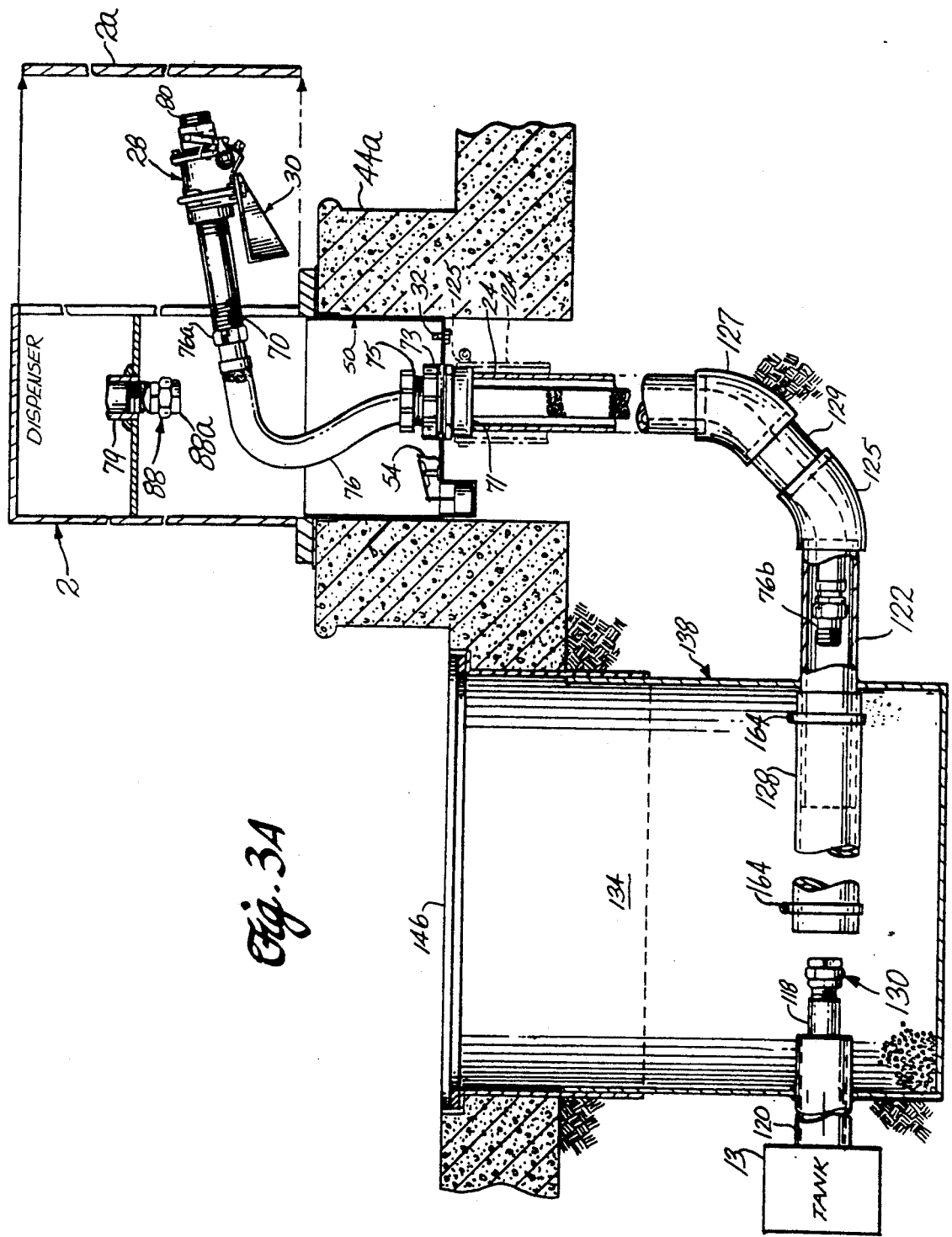

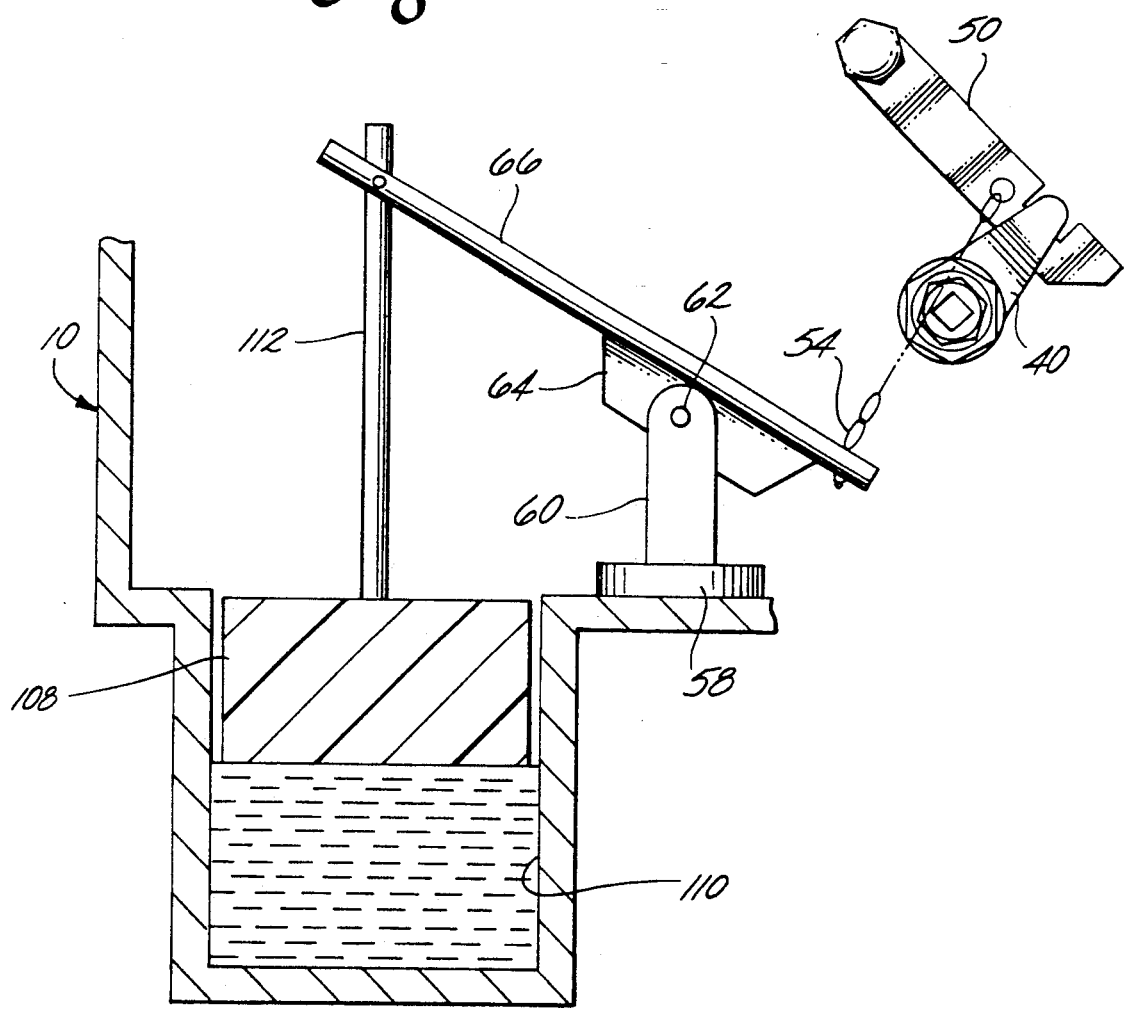

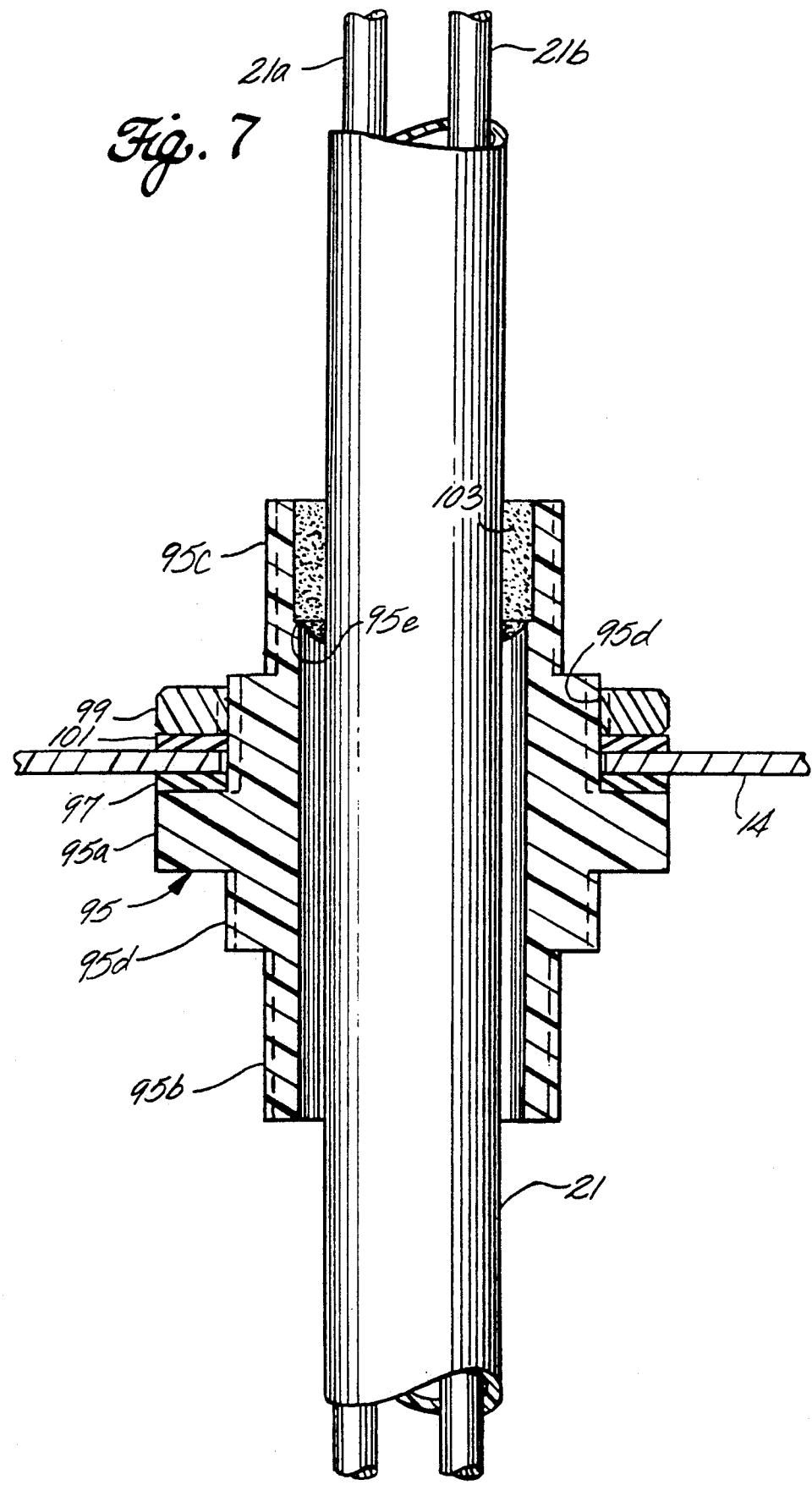

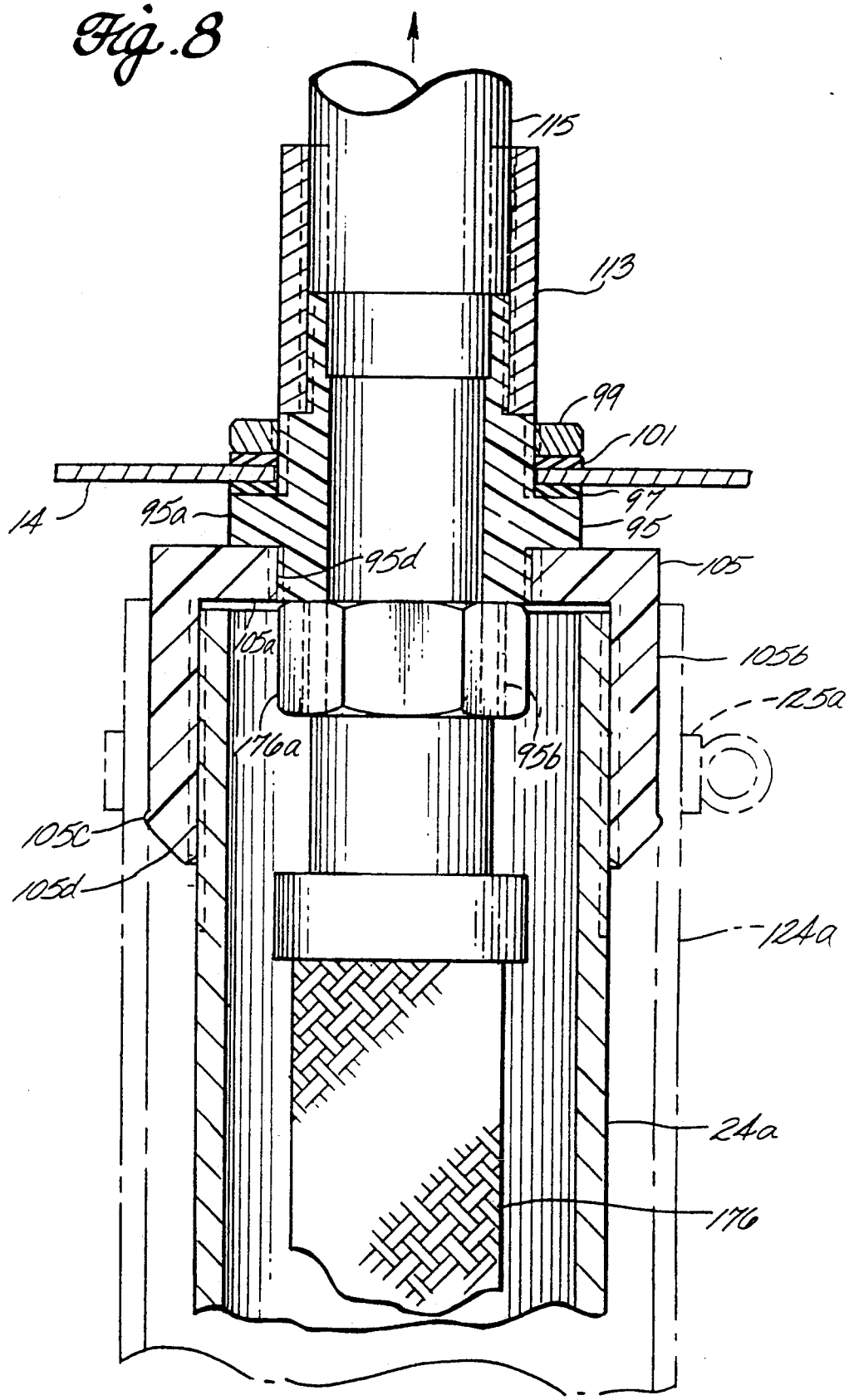

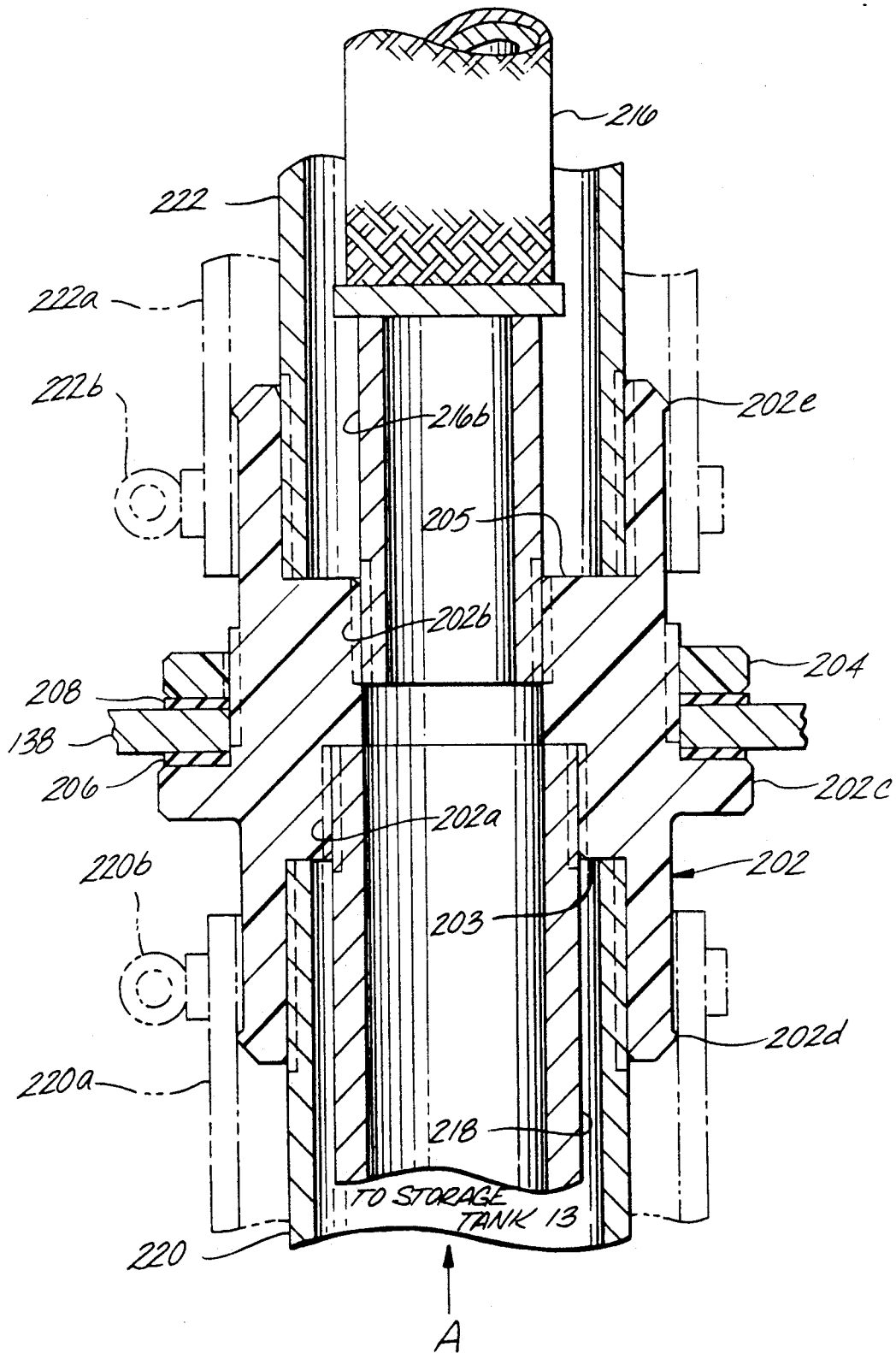

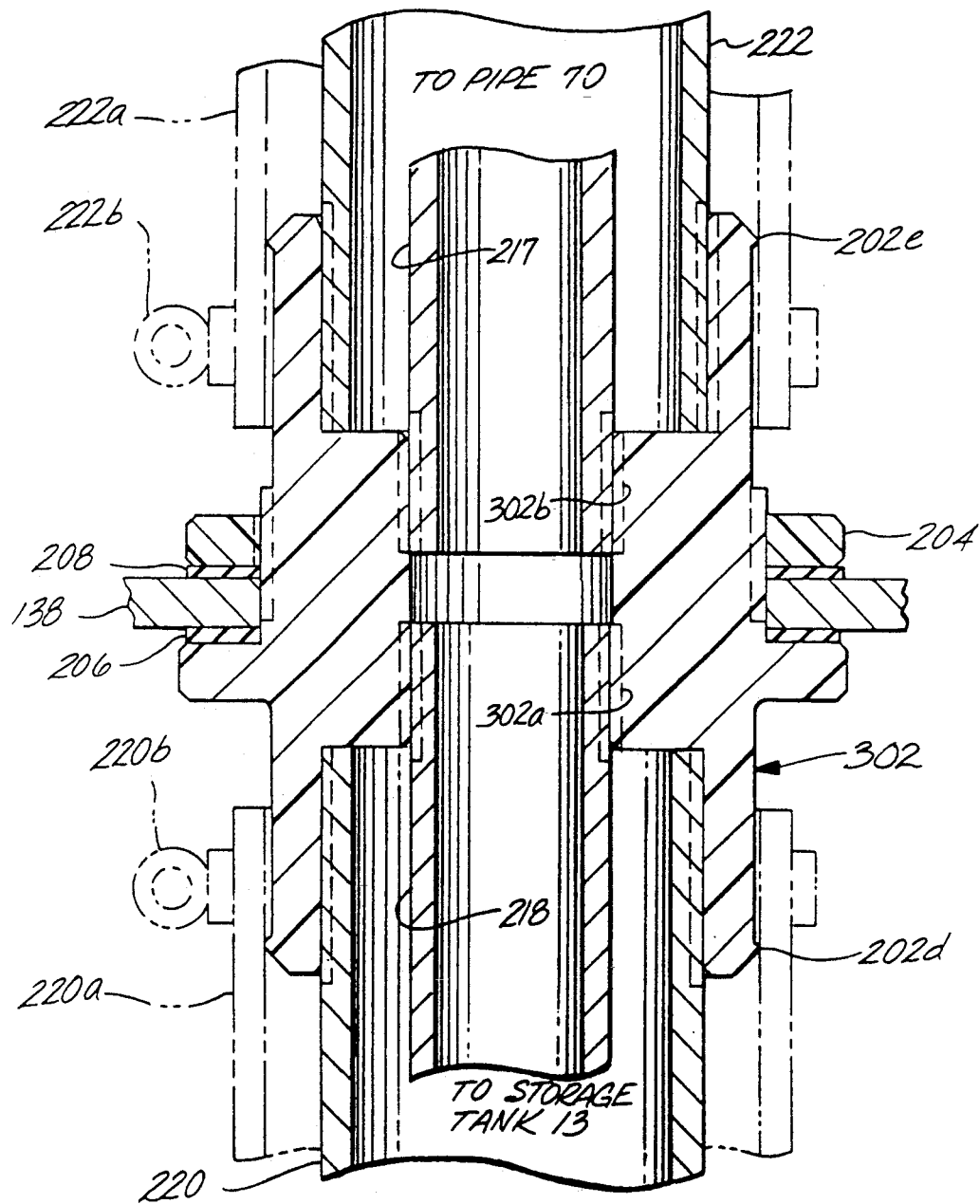

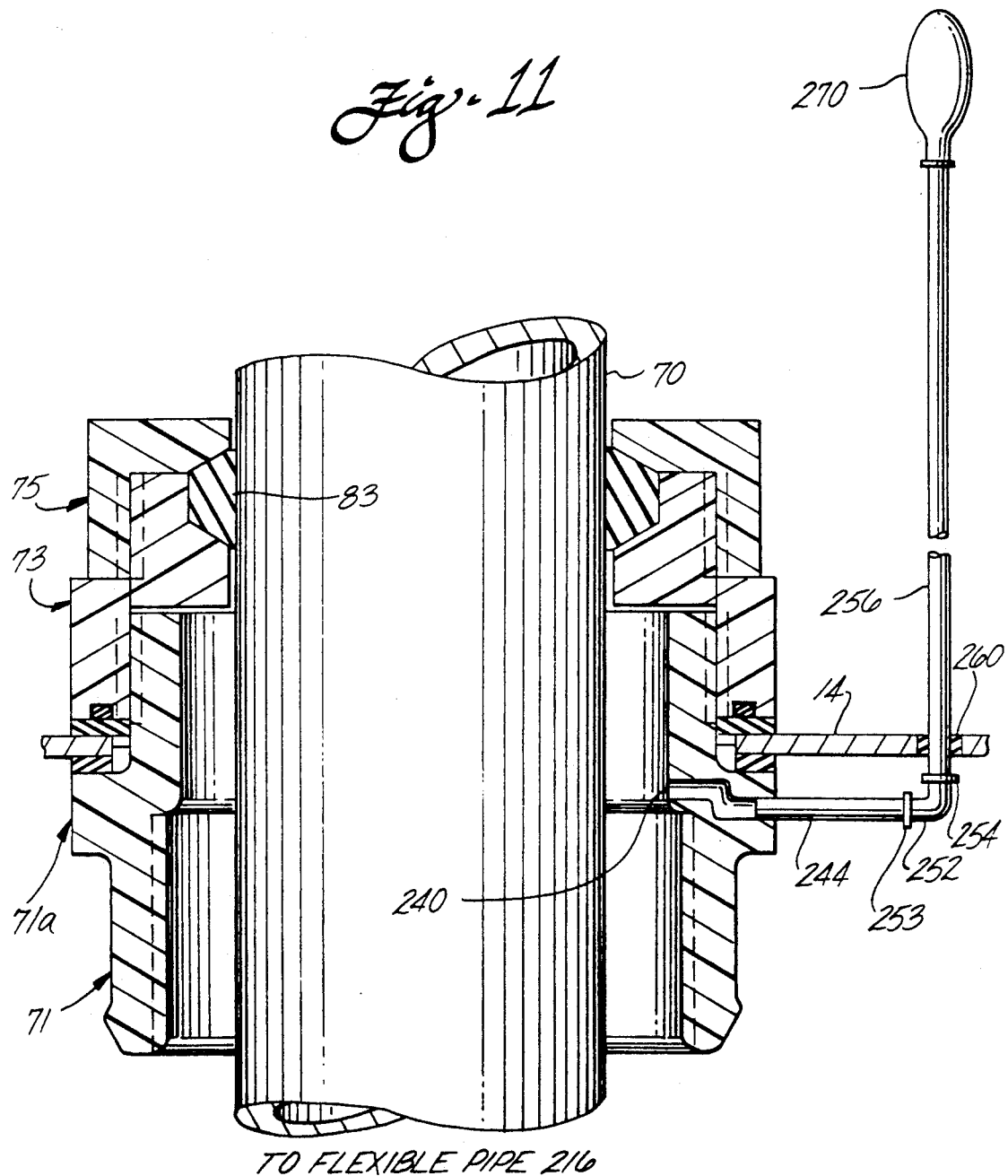

GASOLINE CONTAINMENT SYSTEMS WITH LEAK-RESISTANT PLASTIC FITTINGS

FIELD OF THE INVENTION

The present invention relates to a containment box for collecting gasoline that leaks or spills from service station dispensers or submersible pumps and, more particularly, to a containment system with a leak-resistant fitting for connecting a supply pipeline below the box to an impact valve within the box, with a universal coupling fitting for a leak-resistant connection of electrical wires or vapor recovery piping to the box, and with a terminator fitting for blocking flow through secondary piping of a containment system which allows flow through the primary pipeline.

BACKGROUND OF THE INVENTION

In recent years, increased awareness of air and water pollution problems caused by leaking gasoline or other polluting elements has focused attention on ways to detect and prevent such leaking. To this end, double-walled piping systems ("secondary containment systems") have been developed. For example, in U.S. Pat. No. 4,932,257 (to Webb), a primary pipeline carries gasoline from an underground storage tank to a dispenser, and a secondary pipeline surrounds the primary pipeline to prevent leaking gasoline from contaminating the ground.

In U.S. Pat. Nos. 4,842,163 and 4,971,225 (both to Bravo), a containment box is installed directly below a gasoline dispenser and around an impact valve assembly or around a submersible gasoline pump to collect leaks from the dispenser or pump.

In such secondary containment systems, however, it is difficult to effect repairs on the primary pipeline should a leak develop. Often, one must not only break ground around the gasoline pump, but also break up the island on which the pump is located to determine where the leak is and to fix it.

U.S. Pat. No. 4,971,477 (to Webb et al.) discloses one approach to this problem. In this patent, there is a secondary containment system with a double pipeline formed in segments. Each segment connects two access chambers which extend from ground level to below the pipeline. The ends of an outer pipeline segment connect to fittings built into adjacent chambers, respectively. The ends of an inner pipeline connect to fittings at a position located within adjacent chambers, respectively. The inner pipeline is flexible. When an inner pipeline segment or fitting is in need of repair, the covers of two adjacent chambers are removed and the fittings for the inner pipeline segment are disconnected. Then, that pipeline segment is removed from one of the access chambers for repair or replacement.

In the Webb et al. system, there must be at least two access chambers to remove a flexible inner pipe. Moreover, although Webb et al. show an access chamber below a gasoline dispenser, the patent does not disclose a way to remove the segment leading to the gasoline dispenser. One would have to remove the dispenser and perhaps even break up the island on which the dispenser is located. Moreover, Webb et al. do not address the situation where a containment box, such as in the Bravo patents, is used, and the flexible pipeline connects to a rigid line at a point below the containment box.

To allow for removal of the flexible pipeline, and to allow for adjustable positioning of the pipeline and impact valve with respect to the box and dispenser, the present inventor has created a coupling system for the flexible pipeline to the impact valve, as disclosed in copending U.S. patent application Ser. No. 07/654,952, filed Feb. 14, 1991. The system uses metal fittings and multiple bolts, but these take time to tighten or loosen and require drilling or preforming holes in the box. Accordingly, the fitting is relatively heavy, can be susceptible to leaking, and can be cumbersome to use. Therefore, there is a need for a simpler, lighter weight and more leak- and corrosion-resistant fitting.

The containment box, as disclosed in the above-mentioned Bravo patents, has an opening in the bottom or side, which connects to a vapor recovery system, to remove gasoline and gasoline fumes and return them to the storage tank. There is also an aperture in the box for receiving a conduit with electrical lines connected between the dispenser and storage tank. This aperture and the aperture where the vapor recovery system attaches to the box are potential points of leakage. Therefore, fittings to connect the vapor recovery pipes to the box and to fasten the electrical conduit with respect to the box must also provide a seal. Light-weight fittings which provide a good seal, are corrosion-resistant, and easy to use are desirable. Moreover, it would be desirable to provide a universal fitting that can be used for receiving electrical conduits or for receiving vapor recovery pipes.

In secondary containment systems, such as described in U.S. Pat. No. 4,971,477 to Webb et al. or in copending application Ser. No. 07/654,952, there is a need to pressure test the primary and secondary pipelines during the installation, during subsequent inspection, and during any maintenance, such as leakage repairs. In these secondary containment systems, underground pipelines often have junction fittings, e.g., to facilitate assembly and to facilitate repair and replacement of pipe segments. During such testing, it is common procedure to pressurize the primary pipeline beginning at the storage tank. However, even if a primary pipeline leak is detected, it is difficult to determine which primary pipe segment is leaking.

SUMMARY OF THE INVENTION

In accordance with one aspect of the present invention, a containment box for reducing pollution associated with gasoline handling equipment is provided with a leak-resistant adjustable fitting for connecting a supply pipeline and an impact valve. The box is positioned below a gasoline dispenser or around a submersible pump. The box preferably has a mechanism, such as a well, for providing a signal when a predetermined amount of gasoline has accumulated in it. The box also preferably has a mechanism to amplify the amount of gasoline collected. The fitting has a main body which is substantially annular, with a first end having a smaller diameter and being externally threaded, a second end being internally threaded and having a larger diameter, and an external shoulder separating the two ends. The fitting also has an annular seating piece with a recess for supporting a rubber ring or donut and a clamping piece which is also annular and is internally threaded so as to thread to one end of the seating piece. The clamping piece has an inner recess shaped to accommodate part of the donut. At one end, the main body threads to the seating piece, and at the other end, the main body forms an adaptor which is internally threaded for receiving an outer pipe of a double-walled pipeline. This adaptor end also has a smooth outer surface for attachment of a hose, by using a hose clamp where the outer pipe of the double-walled pipe is formed by a flexible hose. Preferably, the main body has an external shoulder with two protrusions at 180° for locking to the bottom of the containment box.

To seal the box, a gasket is disposed between the box and the shoulder of the main body, and between the box and an end face of the seating piece. The two protrusions on the main body pass through cutouts in one of the gaskets to engage cooperating cutouts in the box.

In accordance with another aspect of the invention, when the clamping piece of the fitting is tightened, the donut is scrunched to seal and fix the supply line passing therethrough. When the clamping piece is loosened, the supply line becomes free, and its position can thus be adjusted, e.g., during assembly and connection to an impact valve and connection of the impact valve to an inlet of the gasoline dispenser. Further, the supply line may be removed from the outer pipeline without excavating, as explained in the detailed description.

In accordance with an additional aspect of the invention, a universal coupler fitting couples a pipe leading to a vapor recovery system outside the box with another pipe in the interior of the box. The universal coupler also couples a secondary pipe or hose that surrounds the vapor recovery pipe to the box. The universal coupler includes a main coupling body with first and second threaded ends of one diameter, and a middle threaded section of greater diameter having an outer shoulder. The main body extends through the box, and its outer shoulder sandwiches a gasket between it and the box bottom. The coupler also includes a nut, which threads onto the greater diameter section of the main body. Another gasket is sandwiched between the nut and the inside of the box. The coupler further includes an adaptor which, at one end, threads onto the greater diameter section of the main body below the shoulder, and which, at its other end, is internally threaded. The vapor recovery pipe threads around the second threaded end of the main body, thus passing through the adaptor. The adaptor is optional. It is used where the vapor recovery pipe is surrounded by a secondary pipe or hose. The secondary pipe either threads to the inside of the adaptor or is clamped to the outside of the adaptor. Vapor recovery piping leading to the pump connection is threaded, via a coupler, to the first end of the main body, inside the box.

A further aspect of the invention is that the universal coupler fitting is used to create a seal around a conduit, e.g., carrying electrical wires, that passes through the box. In this case, the adaptor is not needed. The main body of the coupler has the conduit pass through it. Preferably, the main body has an annular internal shoulder near the first end that serves to help hold sealing compound.

Another aspect of the invention is that an underground fitting for connecting two double-walled pipes so as to allow free flow through the primary pipes, yet stop flow through the secondary pipes, is provided. This fitting is preferably formed by a main body having a central section with two sets of internal threads for receiving the primary pipes, respectively, and two end sections with internal threads of larger diameter for receiving two secondary pipes, respectively. The external surfaces of the sections are adapted to receive secondary pipes formed by hoses. The central section of the fitting acts as an impenetrable terminus to each secondary pipe.

In conjunction with the underground fitting, the secondary containment system uses the above-mentioned adjustable fitting, but with a passageway formed in it to communicate its exterior with the interior of the secondary pipe. The exterior of the passageway is linked to one end of a pipeline with a balloon at its other end. When the primary pipeline is pressure tested, if the balloon enlarges and pops, a leak in the segment of the primary pipeline located between the underground and adjustable fittings is identified.

BRIEF DESCRIPTION OF THE DRAWINGS

FIG. 3 is a front view of the impact valve assembly and its connection to a gasoline dispenser and a flexible supply pipeline using the fitting of FIG. 1;

FIG. 3A is a view similar to FIG. 3, but also including a more detailed view of the supply pipeline to storage tank structure and with the fitting loosened and the impact valve disconnected from the dispenser so that a flexible pipe and the impact valve are removable;

FIG. 4 is an enlarged view of a portion of the box of FIG. 3 for accumulating leaking gasoline, magnifying the effect of the accumulated gasoline, and detecting the accumulated gasoline;

FIG. 7 is a sectional view of the universal coupling fitting of FIG. 1 as used to seal the conduit;

FIG. 8 is a sectional view of the universal coupling fitting of FIG. 1 as used to connect the vapor recovery piping to the box;

FIG. 9 is a sectional view of an underground terminal fitting joining end portions of two double-walled pipelines;

FIG. 10 is a sectional view showing a variation of the fitting of FIG. 9; and

FIG. 11 is a partial sectional and front view similar to FIG. 6 showing a modification to the fitting of FIG. 6 and additional structure for use in pressure testing the supply pipeline.

DETAILED DESCRIPTION OF THE PREFERRED EMBODIMENT

Figure 1:
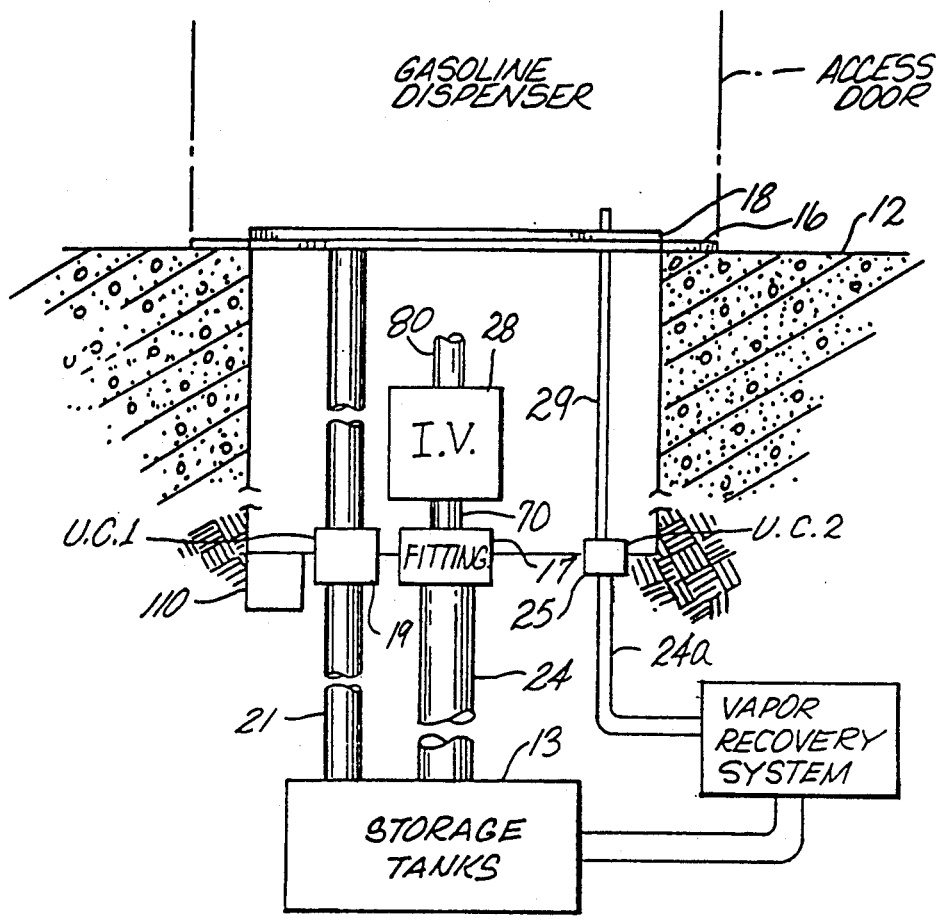
FIG. 1 is a front partial-schematic view of a gasoline collector box for mounting beneath a gasoline dispenser, which box has an impact valve assembly therein and a fitting according to the invention for coupling a double-walled supply pipeline to the box, and two universal coupler fittings according to the invention, one sealing a conduit passing through the box and the other coupling vapor recovery piping to the box.

In accordance with the present invention, as shown in FIG. 1, a gasoline collector 10, such as a containment box, is mounted underneath a gasoline dispenser 2, and has a gasoline supply pipe 70 passing through it to the dispenser's inlet. The box has an adjustable fitting 17 which seals the supply pipe where it passes through the box. The fitting is such that it can be adjusted, i.e., loosened, to allow positioning, and even complete removal of the supply pipe without removing the box or dispenser. The box also has an electrical conduit 21 passing through it, and has a first universal coupler fitting 19 (U.C.1) for sealing box 10 at that point. Further, vapor recovery piping 29 in the box communicates with vapor recovery piping 24a by a second universal coupler fitting 25 (U.C.2) for making this connection and sealing box 10.

First, box 10 will be described with reference to FIGS. 1 and 2 in detail. Such a box is the subject of U.S. Pat. Nos. 4,842,163 and 4,971,225, and of U.S. patent application Ser. No. 07/534,040, filed Jun. 5, 1990, all incorporated by reference herein.

Containment box 10 is shown installed in a concrete island 12 of the type typically found in service stations. Current practice is to mount gasoline dispensers over openings in the concrete island through which the gasoline lines and electrical lines necessary for the operation of the dispenser are run. Following the practice of the present invention, the dispenser is mounted over box 10 installed in the island.

Figure 2:
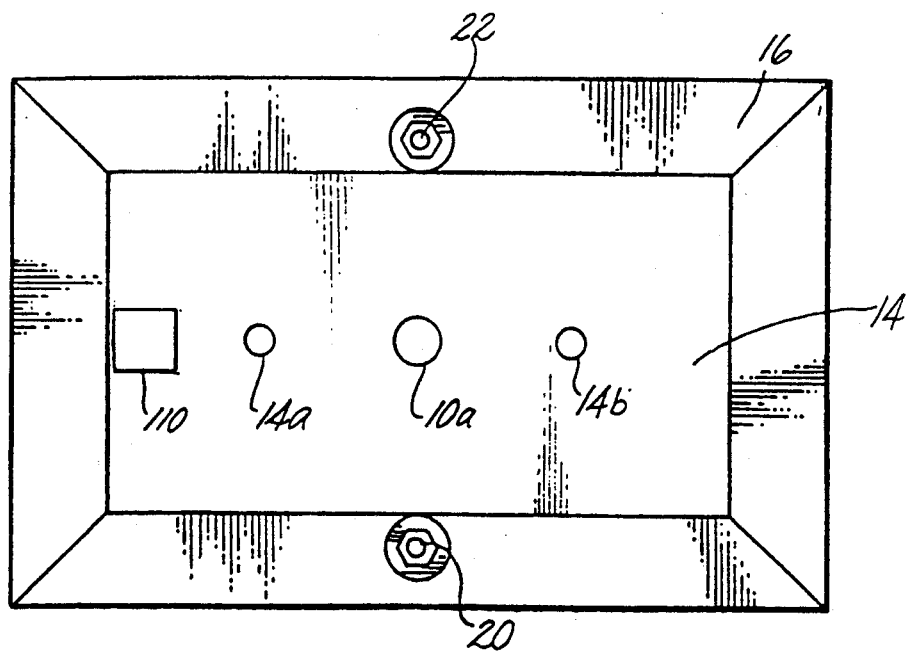
FIG. 2 is a top view of the gasoline collector of FIG. 1 without the impact valve, fitting, supply pipeline and universal coupler fittings.

The housing for most dispensers has a rectangular base, so the box is shown in FIGS. 1 and 2 as rectangular in shape. However, the box can be made to conform with the shape of any dispenser or flammable fluid-handling equipment with which it is associated. For example, some dispensers are now grouped into single modules with one elongated rectangular base. The box could be shaped so as to conform to such a base.

Box 10 is hollow and rectangular and has an open top and a floor 14, which is shown flat but may be slanted. Adjacent the open top is a flange 16 that extends outward from the walls of the box. This flange rests on the top surface of island 12 when the box is installed. The walls of box 10 extend above flange 16 to provide a lip 18 that will prevent water from running into the interior of the box during a rainstorm or washing of the service station. The dimensions of the box are chosen so that a dispenser can be mounted over the box with the lower edges of its base resting on flange 16 adjacent lip 18. A pair of mounting bolts 20 and 22 extend through holes in flange 16 to fix the dispenser in place.

Box 10 is made of 12-gauge steel sheets welded together and covered with a protective coating. However, the box can be made of any durable material that resists corrosion and can stand up to contact with gasoline. In addition, the box can be constructed in any manner that produces sturdy seams that do not allow gasoline to seep through.

An impact or shear valve assembly 28 is provided in the gasoline supply line. This shear valve shuts off the supply of gasoline to the dispenser in the event of an emergency. Shear valves of this type are in common use with gasoline dispensers. Shear valve 28 is mounted inside box 10 near its open top by an L-shaped mounting bracket 30 (FIG. 3). The bracket has a base 31 which attaches to the bottom of box 10 by bolts 32, and an upright wall 33 with slots 34 that receive the threaded ends 35a of a U-shaped bolt 35. Nuts 36 threaded onto each end of bolt 35 hold it in place on bracket 30. For extra support, bracket 30 has a flange 38 or web.

Valve 28 can be activated to close by a spring-loaded trigger 40 pivotally mounted on the outside of the valve. Trigger 40 pivots about a pin 42 which extends out from the outer casing of valve 28. Another pin 44 extends out from the surface of the trigger, where it catches in a notch 48 cut into the top edge of one end of a latch bar 50, which is also pivotally mounted on valve 28. Trigger 40 is normally biased toward a position where valve 28 is closed, as shown in FIG. 4. However, when the trigger is caught in notch 48, as shown in FIG. 3, valve 28 is open, and will stay open as long as it is not disturbed. A disturbance, such as a collision with the gasoline dispenser, will jar latch bar 50, allowing trigger 40 to move to the closed position of FIG. 4.

So far, the description of the shear valve and its operation has not departed from prior practice, except for its being mounted in the gasoline collector of the present invention. However, valve 28 is also used to perform a function shear valves have not served in the past. For this reason, a chain 54 is connected at one end to bar 50. The other end of chain 54 connects to one end of a float mechanism mounted on the floor of the box.

A plate 58 attaches to the floor and has a pair of support members 60 extending upward therefrom opposite one another. A pin 62 is attached to and extends between the free ends of these two support members. A bracket 64 is rotatably mounted on pin 62. Chain 54 is connected to one end of elongated bracket 64. A rod 66 extends along the top surface of bracket 64 and is held in place, e.g., by a pair of loops (not shown) extending up from the surface of the bracket 64 to encircle the rod. At the end of bracket 64 opposite the chain, rod 66 extends out and has a float 108 attached to its end by link arm 112.

When the float raises up, a downward force is exerted on latch bar 50 through the chain so that valve 28 will be closed (FIG. 4). Therefore, when gasoline leaks from the dispenser, it accumulates in the sealed collector and, after raising the float a sufficient amount, valve 28 will close and the dispenser will thereby be shut down. When this happens, it is a signal to the service station owner that a leak is occurring.

The box is relatively flat-bottomed, having a pit 110 or well formed therein. This amplifies gasoline accumulation and allows the float to react more quickly to it. If the box is positioned below a group of dispensers in a single module, where each dispenser has its own gasoline supply line and associated shear valve, a single float mechanism can still be used with the chains from each shear valve connected thereto. Alternatively, separate floats in partitioned areas of the box, each float with its own low point, can be used so that only the leaking dispenser is shut down.

Although the presently preferred embodiment has been described as using a float mechanism, what is important is the provision of a means for alerting the service station operator that gasoline is accumulating in the box, such as an externally manifested signal, e.g., shutting off the gasoline dispensers, or an audible alarm. In any event, accumulation of gasoline should be minimized to reduce the likelihood of a fire. Therefore, it is preferable to have the warning signal triggered for even low levels of accumulation.

Figure 5:
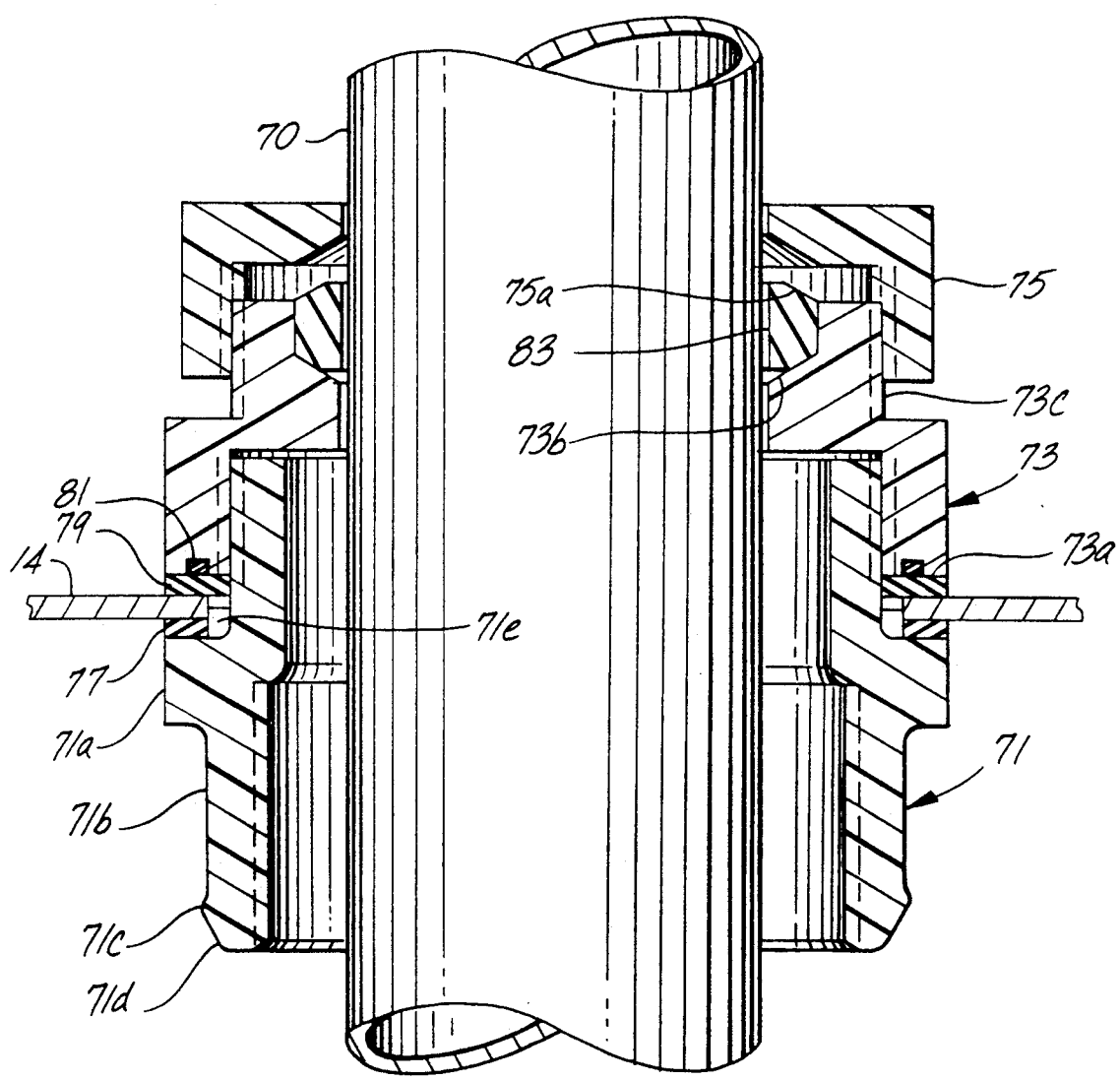
FIG. 5 is a sectional view of the fitting shown in FIG. 3, but in its loosened state, and a partial view of the supply pipe, secondary piping, and impact valve.
Figure 6:
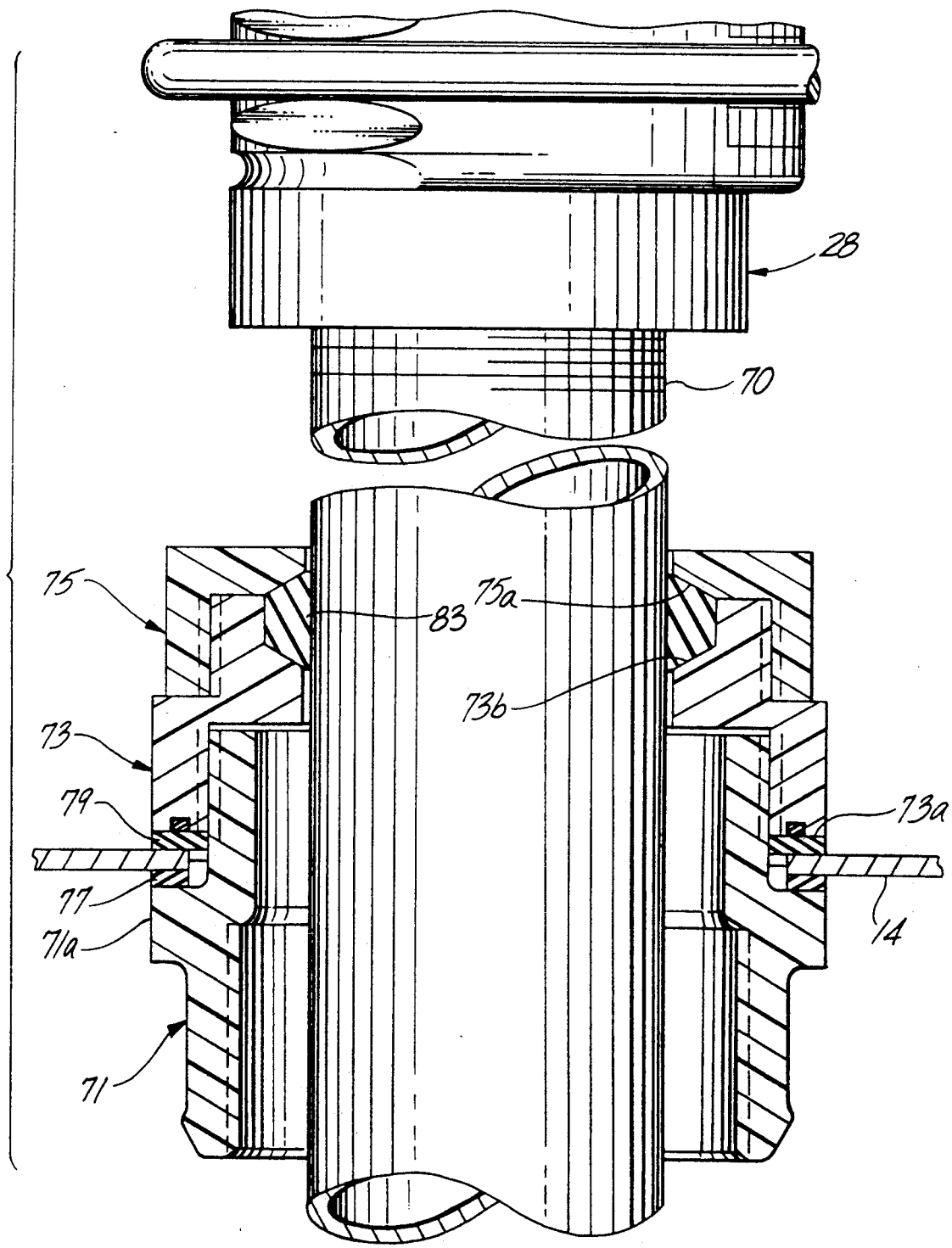
FIG. 6 is a view similar to FIG. 5, but the fitting is in its tightened state.

Next, adjustable fitting 17 will be described in detail, in conjunction with the sectional views of FIGS. 5 and 6, and the front views of FIGS. 3 and 3A.

Fitting 17 comprises a main body 71, and a seating and clamping assembly section, preferably formed by a seating piece 73 and a clamping piece 75. The main body threads to the seating and clamping assembly at seating piece 73. An external shoulder 71a of the main body sandwiches a gasket 77 against the outside of box 10 to form a seal, and an end face 73a of the seating piece 72 presses another gasket 79 against the inside of box 10. Although the drawings are shown with main body 71 extending through aperture 14a (see FIG. 2) in bottom 14, seating piece 73 could extend through the aperture instead, and the seating piece could have an external shoulder.

The seal between the gasket 79 and piece 73 is preferably improved by an O-ring 81 seated in an annular groove in the end face 73a of piece 73. Clamping piece 75 threads onto a smaller diameter section 73c of piece 73. Seating piece 73 has a channel 73b, and clamping piece 75 has a slanted face 75a which, together, receive a deformable ring 83 or donut. When the clamping piece is partially threaded onto seating piece 73, as shown in FIG. 5, there is a clearance between donut 83 and supply pipe 70. However, as shown in FIG. 6, when clamping piece 75 is fully threaded onto seating piece 73, donut 83 scrunches inward and presses against pipe 70 to provide a seal and to fix pipe 70 in place.

Pipe 70 is threaded at its upper portion to impact valve 28 and at its lower portion to a flexible pipe 76, such as Titeflex Fire Safe ™ (manufactured by Titeflex Industrial Americas of Springfield, Mass.), which is a steel-braided flexible connector with an internally threaded nut 76a at one end and an externally threadable rotatable pipe 76b at the other end (FIG. 3A). The upper part of impact valve assembly 28 has a threaded pipe 80a extending upward. A fitting 88 has an integral nut 88a at its lower end which threads onto pipe 80a, and a threaded upper end 88b which threads into inlet 79 of the dispenser.

One method of connecting the valve during assembly is to thread the fitting 88 deep into inlet 79. Before placing the impact valve into position, flexible pipe 76 is threaded onto the bottom of pipe 70 at integral nut 76a. With main body 71 and gasket 77 positioned below the bottom 14 of box 10, the seating and clamping assembly and gasket 79 are positioned by threading seating piece 73 onto main body 71 on the inside of the box. Clamping piece 75 is initially in its loosened state (FIG. 5). In this position, pipe 76 can be snaked through the channel formed by fitting 17.

The bottom end 76b of flexible pipe 76 is then connected to the rest of the primary pipeline, as explained in U.S. patent application Ser. No. 07/654,952, filed Feb. 13, 1991. Pipe 70 follows pipe 76 as the impact valve assembly is lowered into the box. Fitting 88 is then loosened from inlet 79 until it engages pipe 80a, as shown in FIG. 3. Then, clamping piece 75 is tightened to fix pipe 70 and seal the box. The U-bolt 35 and mounting bracket 30 can then be attached. Alternatively, bracket 30 is attached to the bottom of the box and, during insertion of the impact valve, the U-bolt is positioned in channels formed by protrusions 100 in the impact valve, and then its ends are inserted through the slots 34. The nuts 36 are then threaded onto the U-bolt in a loose manner. Once the positioning of the impact valve is finalized, these nuts can be tightened.

FIG. 3A shows how the fitting can be used to allow removal of the impact valve 28 and flexible pipe 76 without excavating or removing the dispenser 2. Storage tank 13 connects to pipe 76 via a pipe 118, which is preferably rigid. The connection occurs inside a large pit 134 formed by a deep box 138. The deep box has a cover 146 flush with the surface of the service station. Secondary piping from the tank 13 to fitting 17 includes three straight pipes 120, 122, 124, e.g., of FIBERGLASS ™. Two 45° elbows and a short straight pipe 125, 127, 129, respectively, e.g., also of FIBERGLASS ™, and a flexible sleeve 128, e.g., accordion style. The sleeve is over the connection point of pipes 118, and 76 and is held there by two band clamps 164, 164. When the clamps are loosened, the sleeve is slidable to the side to reveal the connection point. This structure is also described in U.S. patent application Ser. No. 07/654,952, filed Feb. 13, 1991, which is hereby incorporated by reference.

Thus, with reference to FIG. 3A, fitting 17 can also be used to remove flexible pipe 76 as follows. Initially, the dispenser is turned off, flexible pipe 76 is disconnected at swivel end 76b by removing cover 146 of pit box 138, and sliding sleeve 128 to reveal end 76b, decoupling end 76b, and threading plug 130 into pipe 118. The first step at the containment box is to thread fitting 88 further into inlet 79 to uncouple with pipe 80a. Second, the chain 54 is disconnected from the impact valve. Third, the nuts 32a are removed from bolts 32. Fourth, the end of pipe 76 (which is not shown) can be disconnected. Finally, the clamping piece 75 is loosened to the point where pipe 70 can move freely within the fitting. In this state, the impact valve assembly, pipe 70, flexible pipe 76, and bracket 30 can all be removed through the box without removing the box or the dispenser, and without excavating. These steps can be performed in any order that is practical. Pipe 76 and the rest of the assembly can be replaced, as explained above with respect to assembly.

Additional preferred aspects of fitting 17 are as follows. The outer surfaces of clamping piece 75 and seating piece 73 have a polygonal shape, as shown in FIGS. 3 and 3A, for ease in threading and unthreading the pieces by use of a wrench or the like. The outer shape of shoulder 71a of main body 71 is preferably oval or rounded. The outer surface 71b of most of the rest of main body 71 is preferably round and has a ridge 71c followed by a tapering surface 71d. Main body 71 is internally threaded at its "adaptor" or "coupler" portion which is below box 10 to receive externally threaded secondary pipe 24, as shown in solid lines in FIG. 3. Such a pipe is preferably three-inch piping. Alternatively, where the secondary piping is a flexible hose, such as hose 124 shown in phantom in FIG. 3, it attaches to the round outer surface 71b by a radiator or band clamp 125. Tapering surface 71d helps register the end of the hose 24, and ridge 71c helps to hold the hose and clamp in place. Where it is known that this main body will be used with a hose-type outer piping, the main body need not be internally threaded. Such a hose may be three inches or four inches, for example. Where the adaptor portion of the fitting is adapted for a three-inch pipe, it is preferable to also adapt it for a four-inch hose.

Main body 71 also has two protrusions, for example, semicircular in section and labeled 71e, extending outward at 180° from each other on the portion of main body 71 adjacent shoulder 71a. These protrusions can fit through slots in gasket 77 and corresponding slots in bottom 14 of box 10 to fix main body 71 against rotation.

Now, the universal coupler fitting according to the invention will be described with reference to FIGS. 7 and 8. Universal coupler 19 (of FIG. 1) is shown in detail in FIG. 7 for sealing conduit 21, e.g., containing electrical wires, with respect to a hole 14a (FIG. 2) in the bottom of box 10. The universal coupler is shown installed with a main body 95 extending through hole 14a such that an external shoulder 95a of the main body presses a gasket 97 against box bottom 14. Main body 95 has threaded upper and lower ends 95c, 95b, respectively, of relatively smaller outer diameter compared with an outer diameter of a threaded middle section 95d. The external shoulder 95a extends outward from an intermediate location along this middle section. The integral outer shoulder helps prevent leakage from occurring along the threads. A preferred internal diameter of the coupler is A nut 99, which threads onto the upper portion of middle section 95d, presses another gasket 101 down against box bottom 14 to seal hole 14a. To seal any gap between conduit 21 and main body 95, the main body has an internal shoulder 95e and recess which helps support sealing compound 103 to prevent leaks between the conduit and the main body 95. Preferably, the diameter at the recess is 1½ inches, and the sealing compound is compatible with gasoline and other flammable fluids, and paper and "chico" may also be used to fill the gap, such as below the shoulder to support the compound while wet. It is also preferable that the external shoulder 95a and nut 99 have polygonal outer shapes, e.g., the same as used with fitting 17, so as to be adapted for use with a wrench.

FIG. 8 shows the universal coupler fitting 25 for connecting vapor recovery piping, e.g., at hole 14b. This universal coupling element uses the same main body, same gaskets 97, 101, and same nut 99 as used for sealing the hole 14a with electrical conduit 21 passing therethrough. However, in this case, since it is desirable to remove gasoline and/or fumes through primary vapor recovery pipe 176, the channel through the main body of the fitting remains open, and no sealing compound is necessary. The pipe 176, which is shown in FIG. 8 as a flexible pipe like pipe 76, has an integral nut 176a at one end. This nut 176a threads onto the lower end 95b of main body 95. The threads at the upper end of the main body receive a standard metal coupler 113 for connecting a pipe 115 which ultimately connects to the dispenser's hose, as is well known in the art. The coupler 113 can also be a bell reducer coupling if pipe 115 is of a smaller diameter than the threaded end of main body 95.

If secondary piping is not used in connection with the vapor recovery system, no further structure is necessary. However, secondary piping is preferred, and such piping is shown in FIG. 8. For example, a secondary pipe 24a, similar to pipe 24 of FIG. 3, is shown in solid lines. To connect this pipe with the universal coupling member, an adaptor piece 105 has an annular section 105a which is internally threaded to attach to the lower portion of middle section 95d so as to abut external shoulder 95a of main body 95. This adaptor piece has an annular adaptor section 105d which is internally threaded to accommodate pipe 24a. Pipe 24a is preferably three-inch pipe, for example. If a hose-type secondary piping is used, such as hose 124a shown in phantom in FIG. 8, which is similar to that of hose 24a shown in FIG. 3, the adaptor piece 105 need not be internally threaded. In this case, the hose fits around the outside round surface 105b of the adaptor piece and is attached using a band or radiator clamp 125a. A ridge 105c facilitates securing the clamp and hose in place, and a tapered surface 105d facilitates registering the hose around the adaptor piece 105. Such a hose can be, for example, three inches or four inches in diameter. Thus, preferably, the universal coupling element would be made with a choice of two adaptor pieces, one for three-inch hose in which there need not be any internal threads, and the other adapted for three-inch pipe (in which case there are internal threads) and also for four-inch hose. Fitting 17 can have its main body made this way, too, by having two alternative main bodies, one with a three-inch internal thread and four-inch outer diameter, and the other with a three-inch outer diameter and no internal threads. Depending on the secondary piping, an appropriate one of the main bodies is selected.

A further fitting according to the invention, and a modification of fitting 17 for simplifying pressure testing of the secondary containment, is described with reference to FIGS. 9 and 11.

This further fitting includes a main body 202 and a nut 204, and is adapted for connecting the terminus of one double-walled pipe to the terminus of another, and preventing air flow between secondary pipes 220, 222 (or 222a, 222b), yet allowing flow through primary pipes 216, 218.

The main body has an intermediate section with two sets of internal threads 202a, 202b, respectively. One set 202b preferably is of lesser diameter than the other set 202a to accommodate a flexible pipe 216 having, e.g., a 1½ inch threaded swivel end 216b. The other set 202a preferably has a diameter to accommodate a 2-inch rigid pipe 218 from storage tank 13. The main body has an integral external shoulder 202c at the central section, and is externally threaded at one side of the central section to receive nut 204. As in the case of the adjustable fitting, protrusions may be formed adjacent the shoulder 202c, and corresponding cutouts may be provided in gasket 206 and pit box 138. In addition, nut 204 may have a polygonal outer surface.

The main body has internal threads at each of its ends, which accommodate secondary pipes 220, 222. The ends also have smooth outer surfaces with ridges 202d, 202e to receive flexible hoses 220a, 222a fixed by clamps 220b, 222b, as shown in phantom. Preferably, the internal threads accommodate 3-inch pipes, while the external surface accommodates 4-inch hose. However, the main body may be modified to accommodate only one or the other, or smaller hose, such as 3-inch hose. As in the previous embodiments, the secondary pipes are preferably either flexible hose, or FIBERGLASS™ pipes or even telescoping pipes such as disclosed in U.S. Pat. No. 4,932,257 to Webb. The central section of the main body, as defined by shoulders 203, 205, prevents air from passing between the secondary pipes, yet allows free flow between the primary pipes. This structure is significant for pressure testing, as will be explained herein.

To facilitate pressure testing, the preferred location for this fitting is at the wall of the pit box 138 (of FIG. 3A) which is closest to the storage tank 13. Shoulder 202c is thus on the outside of the pit box 138 and nut 204 is on the inside, each sandwiching a gasket 206, 208, respectively, against the box 138. To achieve this structure from that of FIG. 3A, it is preferable to use a flexible pipe 216, which is longer than flexible pipe 76 in place thereof, and secondary piping 222 (or 222a) which extends directly to elbow 125 of FIG. 3A in place of pipe 122, sleeve 128, and clamps 164. In this case, plug 130 would fit into threads 202b of the fitting when needed. Rigid pipe 218 replaces shorter pipe 118, and secondary pipe 220 replaces shorter pipe 120.

The flexible pipe 216 connects at its upper end to pipe 70 in the same way as pipe 76 connected thereto. As shown in FIG. 11, to assist in pressure testing the primary pipeline, a passageway 240 is drilled or otherwise formed through the main body of fitting 17 and adapted for receiving a pipe, e.g., a steel pipe 244 fixed to the passageway, e.g., by threading therein. This pipe 244 leads to an elbow 252 having a compression fitting actuated by a nut 253. The other end of elbow 252 has another nut 254 actuating a compression fitting for a pipe, e.g., a steel pipe 256. Pipe 256 passes through a hole in box bottom 14, sealed by a rubber grommet 260. The pipe 256 ends near the top of the box 10, or beyond the box, and has a balloon 270 on its end.

With the structure of FIGS. 9 and 11, the primary pipeline can be readily pressure tested by applying testing pressure to the end of rigid pipe 218 in the direction of arrow A. When this is done, air passes through pipe 218, through the main body 202 of the fitting, and through the flexible pipe 216. With the impact valve closed, or the system otherwise closed at that end, if there is a leak in flexible pipe 216, air must enter the secondary pipes between fitting 17 and main body 202 of the underground terminator fitting. Such air then passes through the passageway and ultimately inflates and pops the balloon 270. This alerts the tester to the fact that there is a primary pipeline leak, and, due to main body 202, it isolates the leak in pipe 216.

The system also assists in isolating a leak in pipe 218, which would manifest itself by way of air passing through secondary pipe 220, because the air will be stopped by main body 202. This structure also facilitates testing of the secondary pipes, and still allows easy removal of the flexible pipe 216. Further, if there is a leak in the flexible pipe, the gasoline will fill only the secondary piping leading to the containment box, thereby controlling the leak.

A variation of the fitting is shown in FIG. 10, where a main body 302 is formed with both threads 302a, 302b of the same diameter, e.g., 2 inches, to accommodate two rigid primary pipes 218, 217. The structure is otherwise the same as that in FIG. 9.

The universal coupling elements and the fitting 17 and fitting 202 and associated nuts and adaptors are preferably made of plastic of a type which is compatible with gasoline and other flammable fluids and injection-molded. One such plastic is acetal. It is most preferred to use acetal co-polymer having glass-fiber reinforcing in amounts such as from 5% to 10%, or even up to 25%.

It is further noted that the threads on the universal coupling fitting, at least the middle section having the larger diameter, are standard taper or Butler pipe threads to help prevent leakage and weakening of the grip, and all other threads can be standard American national pipe threads. In fact, all threads which connect to other plastic elements of the fittings, such as the outer threads in adjustable fitting 17, are preferably taper or Butler threads, and all threads which connect to pipes or standard couplers are preferably standard national pipe threads.

The gaskets, O-ring, and donut are preferably of a flexible material, such as rubber, which is compatible with gasoline and other flammable fluids.

It is understood by those skilled in the art that changes in the form and detail of the above-described embodiments may be made without departing from the spirit of the invention.

What is claimed is:

1. An apparatus for reducing pollution associated with gasoline handling equipment and a gasoline supply pipe leading to such equipment, comprising:
   containment means for collecting gasoline spilling from the gasoline handling equipment, the containment means having an aperture defined therein;
   a gasoline supply pipe passing through the aperture in the containment means and leading to the gasoline handling equipment; and
   a hollow fitting for sealing the aperture and fixing the supply pipe with respect to the box, the fitting comprising:
      a hollow main body, a hollow deformable element, a hollow seating piece for seating the deformable element and being attachable to one end of the main body, and hollow clamping means for threading onto the seating piece and for camming the deformable sealing element radially inward, wherein the supply pipe is disposed through the hollow fitting, and the main body and seating piece are attached, and there is one gasket disposed between the main body and the containment means and a further gasket disposed between the seating piece and the containment means, and wherein the hollow clamping means is threaded onto the seating piece so as to cam the deformable sealing element against the supply pipe,
   wherein there is a secondary pipeline surrounding the supply pipeline, and the main body has an adaptor section at an end of the main body remote from the one end, the adaptor section having a cylindrical extension for connection with the secondary pipeline.

2. Apparatus according to claim 1 wherein the seating piece threads to the main body.

3. Apparatus according to claim 1 wherein the main body has a shoulder extending outward therefrom, and the one gasket is disposed between the shoulder and the containment means.

4. Apparatus according to claim 3 wherein protruding means is formed adjacent the shoulder of the main body, and the one gasket and the containment means have recesses formed at their inner periphery adjacent the aperture in the containment means, and the one gasket and main body are positioned such that the projection means extends through the recesses in the one gasket and into the recesses in the containment means to prevent rotation of the main body.

5. Apparatus according to claim 1 wherein the containment means further comprises means for amplifying an amount of accumulated gasoline in the containment means, and means for shutting off the gasoline handling equipment in response to the amplified accumulation of gasoline.

6. Apparatus according to claim 1 wherein the gasoline handling equipment comprises an impact valve disposed in the containment means and a gasoline dispenser connected to one side of the impact valve, the gasoline supply pipe leading to another side of the impact valve, and the gasoline dispenser being mounted at its base on top of the containment means.

7. Apparatus according to claim 6 wherein in response to loosening the threaded clamping means from the seating piece, the deformable sealing element loosens from the supply pipe, whereby the supply pipe is adjustable and removable with respect to the fitting.

8. Apparatus according to claim 7 wherein the supply pipe comprises a rigid pipe connected to an impact valve, the gasoline handling equipment further comprising means for removably attaching the impact valve to an inlet of the gasoline dispenser, and means for removably bracing the impact valve within the containment means, the supply pipe further comprising a flexible pipe fastened to the rigid pipe outside of the containment means, and wherein, in response to disconnection of the impact valve from the inlet and unthreading of the clamping means from the seating piece, and disconnection of the bracing means from the containment means, the impact valve, rigid pipe, and flexible pipe are removable from the containment means by pulling the impact valve through an access door of the gasoline dispenser.

9. Apparatus according to claim 1 wherein an outer circumferential surface of the seating piece and an outer circumferential surface of the clamping means have polygonal shapes for facilitating use of a wrench for threading.

10. Apparatus according to claim wherein the clamping piece, seating piece, and main body comprise acetal with glass fiber reinforcing.

11. An apparatus for reducing pollution associated with gasoline handling equipment and a conduit leading to such equipment, comprising:
containment means for collecting gasoline spilling from the gasoline handling equipment, the containment means having an aperture defined therein,
the conduit passing through the aperture and leading to the gasoline handling equipment; and
a hollow fitting for sealing the aperture, the fitting comprising:
a hollow main body having first and second threaded ends and a threaded intermediate section of diameter greater than the first and second ends, and a shoulder extending outward from the intermediate section, the conduit being disposed through the main body, and the fitting further comprising a nut for threading to the intermediate section, and there are first and second gaskets, the first gasket being sandwiched between the containment means and the shoulder of the main body, and the second gasket being sandwiched between the nut and the containment means, with the nut threaded onto the intermediate section of the main body.

12. Apparatus according to claim 11 wherein the containment means further comprises means for amplifying an amount of accumulated gasoline in the containment means, and means for shutting off the gasoline handling equipment in response to the amplified accumulation of gasoline.

13. Apparatus according to claim 11 wherein the containment means is mounted below and attached to the base of the gasoline dispenser, and the gasoline handling equipment comprises an impact valve disposed in the containment means, the gasoline supply pipe leading to the impact valve, and the gasoline handling equipment comprising a gasoline dispenser having an inlet, the inlet being connected to the impact valve.

14. Apparatus according to claim 11 wherein the main body further comprises an annular shoulder formed in a surface defining its hollow interior, and wherein sealing compound is disposed between the conduit and main body and against the internal shoulder.

15. Apparatus according to claim 11 wherein the conduit carries electrical wires connected to the gasoline handling equipment.

16. Apparatus according to claim 11 further comprising a further fitting formed identically to the fitting for sealing the aperture, and the containment means has a further aperture formed therein, the gasoline handling equipment further comprising a pipeline leading to a vapor recovery system, the further fitting being adapted for connecting the pipeline to the containment means at the further aperture so as to provide a seal, the pipeline being threaded to the first end of the main body.

17. Apparatus according to claim 16 wherein there is a secondary pipeline surrounding the pipeline to the vapor recovery system, and the further fitting additionally comprises an adaptor to the intermediate section adjacent the external shoulder and remote from the containment means, the adaptor having a cylindrical extension for connection with the secondary pipeline.

18. Apparatus according to claim 11 wherein an outer circumference of the nut and an outer circumference of the external shoulder are formed with polygonal shapes for facilitating use with a wrench.

19. Apparatus according to claim 11 wherein the nut and main body comprise acetal with glass fiber reinforcing.

20. An apparatus for reducing pollution associated with gasoline handling equipment which includes a pipeline to a vapor recovery system, the apparatus comprising:
containment means for collecting gasoline spilling from the gasoline handling equipment, the containment means having an aperture defined therein;
a pipeline leading to a vapor recovery system; and
a hollow fitting for connecting the pipeline to the containment means at the aperture so as to provide a seal, the fitting comprising:
a hollow main body having first and second threaded ends, and a threaded intermediate section of diameter greater than the first and second ends, and a shoulder extending outward from the intermediate section, the pipeline being threaded to the first end of the main body, and the fitting further comprising a nut for threading to the intermediate section, and there are first and second gaskets, the first gasket being sandwiched between the containment means and the shoulder of the main body, and the second gasket being sandwiched between the nut and the containment means, with the nut threaded onto the intermediate section of the main body.

21. Apparatus according to claim 20 wherein there is a secondary pipeline surrounding the pipeline to the vapor recovery system, and the fitting further comprises an adaptor threaded to the intermediate section adjacent the shoulder and remote from the containment mans, the adaptor having a cylindrical extension for connection with the secondary pipeline.

22. Apparatus according to claim 20 wherein the containment means further comprises means for amplifying an amount of accumulated gasoline in the containment means, and means for shutting off the gasoline handling equipment in response to the amplified accumulation of gasoline.

23. Apparatus according to claim 20 wherein the gasoline handling equipment comprises an impact valve disposed in the containment means and a gasoline dispenser connected to one side of the impact valve, the gasoline supply pipe leading to another side of the impact valve, and the gasoline dispenser being mounted at its base on top of the containment means.

24. Apparatus according to claim 20 wherein an outer circumference of the nut and an outer circumference of the external shoulder are formed with polygonal shapes for facilitating use with a wrench.

25. Apparatus according to claim 20 wherein the threaded intermediate section has threads comprising taper threads.

26. Apparatus according to claim 20 wherein the main body, nut, and adaptor comprise acetal with glass fiber reinforcing.

27. An apparatus for reducing pollution associated with gasoline handling equipment and a gasoline supply pipe leading to such equipment, comprising:
   containment means for collecting gasoline spilling from the gasoline handling equipment, the containment means having an aperture defined therein;
   a gasoline supply pipe passing through the aperture in the containment mans and leading to the gasoline handling equipment; and
   a hollow fitting for sealing the aperture and fixing the supply pipe with respect to the box, the fitting comprising:
      a hollow main body, a hollow deformable element, a hollow seating piece for seating the deformable element and being attachable to one end of the main body, and hollow clamping means for threading onto the seating piece and for camming the deformable sealing element radially inward, wherein the supply pipe is disposed through the hollow fitting, and the main body and seating piece are attached, and there is one gasket disposed between the main body and the containment means and a further gasket disposed between the seating piece and the containment means, and wherein the hollow clamping means is threaded onto the seating piece so as to cam the deformable sealing element against the supply pipe, wherein the one end of the main body extends through the aperture in the containment means.

28. An apparatus for reducing pollution associated with gasoline handling equipment and a gasoline supply pipe leading to such equipment, comprising:
   containment means for collecting gasoline spilling from the gasoline handling equipment, the containment means having an aperture defined therein;
   a gasoline supply pipe passing through the aperture in the containment means and leading to the gasoline handling equipment; and
   a hollow fitting for sealing the aperture and fixing the supply pipe with respect to the box, the fitting comprising:
      a hollow main body, a hollow deformable element, a hollow seating piece for seating the deformable element and being attachable to one end of the main body, and hollow clamping means for threading onto the seating piece and for camming the deformable sealing element radially inward, wherein the supply pipe is disposed through the hollow fitting, and the main body and seating piece are attached, and there is one gasket disposed between the main body and the containment mans and a further gasket disposed between the seating piece and the containment means, and wherein the hollow clamping means is threaded onto the seating piece so as to cam the deformable sealing element against the supply pipe, wherein the seating piece has an end face for contacting the further gasket, the end face having an annular groove formed therein and an O-ring disposed in the groove.

* * * * *

UNITED STATES PATENT AND TRADEMARK OFFICE
CERTIFICATE OF CORRECTION

PATENT NO. : 5,285,829
DATED : February 15, 1994
INVENTOR(S) : Sergio M. Bravo

It is certified that error appears in the above-indentified patent and that said Letters Patent is hereby corrected as shown below:

Column 6, line 11, after "function" insert -- that --.

Column 9, line 6, after "coupler is" insert
    -- 1-7/16 inches --.

Column 13, line 15, after "claim" insert -- 1 --.

Column 14, line 50, change "mans" to -- means --.

Column 15, line 14, change "mans" to -- means --.

Column 16, line 25, change "mans" to -- means --.

Signed and Sealed this

Eleventh Day of October, 1994

Attest:

BRUCE LEHMAN

*Attesting Officer*  *Commissioner of Patents and Trademarks*